United States Patent
Masuda

(10) Patent No.: US 10,440,274 B2
(45) Date of Patent: Oct. 8, 2019

(54) IMAGING APPARATUS CAPABLE OF IMAGING WITH THE USE OF AN ILLUMINATION APPARATUS INCLUDING A FLASH UNIT CAPABLE OF CHANGING A RADIATION DIRECTION, CONTROL METHOD FOR THE SAME, AND PROGRAM

(71) Applicant: CANON KABUSHIKI KAISHA, Tokyo (JP)

(72) Inventor: Yuta Masuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 15/262,903

(22) Filed: Sep. 12, 2016

(65) Prior Publication Data

US 2017/0078580 A1    Mar. 16, 2017

(30) Foreign Application Priority Data

Sep. 14, 2015    (JP) .................................. 2015-181246

(51) Int. Cl.
  *H04N 5/232*    (2006.01)
  *H04N 5/225*    (2006.01)
  *H04N 5/235*    (2006.01)
  *G03B 7/16*    (2014.01)

(52) U.S. Cl.
  CPC .......... *H04N 5/23293* (2013.01); *G03B 7/16* (2013.01); *H04N 5/2256* (2013.01); *H04N 5/2351* (2013.01); *H04N 5/2354* (2013.01)

(58) Field of Classification Search
  CPC .... G03B 7/16; H04N 5/23293; H04N 5/2256; H04N 5/2351; H04N 5/2354; G01J 1/08
  See application file for complete search history.

(56) References Cited

U.S. PATENT DOCUMENTS

| 8,160,438 B2* | 4/2012 | Shintani | H04N 5/2354 |
| | | | 396/174 |
| 2002/0039490 A1* | 4/2002 | Hagiuda | G03B 15/03 |
| | | | 396/155 |
| 2009/0310013 A1* | 12/2009 | Odaka | G03B 15/03 |
| | | | 348/371 |

(Continued)

FOREIGN PATENT DOCUMENTS

| JP | 63-204238 A | 8/1988 |
| JP | 3-231729 A | 10/1991 |

(Continued)

*Primary Examiner* — Luong T Nguyen
(74) *Attorney, Agent, or Firm* — Canon U.S.A., Inc. IP Division

(57) ABSTRACT

An imaging apparatus is capable of imaging with the use of an illumination apparatus including a flash unit capable of changing a radiation direction, and includes: a photometry unit; a display unit that displays information about a result of photometry using the photometry unit; and a display control unit that executes a control related to display on the display unit, wherein when the illumination apparatus is performing a first operation of multiple emissions by the flash unit while changing automatically the radiation direction of the flash unit to a plurality of different directions, the display control unit performs a control so as not to display the information about the photometry result on the display unit.

26 Claims, 8 Drawing Sheets

(56) References Cited

U.S. PATENT DOCUMENTS

2013/0314565 A1* 11/2013 Spielberg ............... G03B 15/05
 348/224.1
2015/0131257 A1* 5/2015 Kaimoto ................ G03B 15/05
 362/5

FOREIGN PATENT DOCUMENTS

JP 2011-137960 A 7/2011
JP 2015-4932 A 1/2015

* cited by examiner

IMAGING APPARATUS CAPABLE OF IMAGING WITH THE USE OF AN ILLUMINATION APPARATUS INCLUDING A FLASH UNIT CAPABLE OF CHANGING A RADIATION DIRECTION, CONTROL METHOD FOR THE SAME, AND PROGRAM

BACKGROUND

1. Field of the Disclosure

The present disclosure relates to an imaging apparatus that is capable of notifying a user of a photometry result.

2. Description of the Related Art

There is known a conventional technique for notifying a user of a photometry result of a subject. Japanese Patent Laid-Open No. 3-231729 discloses a technique for displaying a shutter speed and an aperture value calculated by photometry in a finder or a monitor.

In addition, there are known an imaging apparatus and a flash device that are capable of bounce flash imaging by which to reflect light radiated from an illumination apparatus on an object and capture an image of the subject while illuminating the subject with the reflection light. Japanese Patent Laid-Open No. 2015-4932 proposes a technique for automatically driving a strobe device to change the direction of radiation for bounce flash imaging based on reflection light resulting from pre-flashing of the strobe device toward the subject and the ceiling (hereinafter, called auto-bounce operation).

SUMMARY

According to an embodiment of the present disclosure, there is provided an imaging apparatus capable of imaging with the use of an illumination apparatus including a flash unit capable of changing a radiation direction, including: a photometry unit; a display unit configured to display information about a result of photometry using the photometry unit; and a display control unit configured to execute a control related to display on the display unit, wherein, when the illumination apparatus is performing a first operation of multiple emissions by the flash unit while changing automatically the radiation direction of the flash unit to a plurality of different directions, the display control unit performs a control so as not to display the information about the photometry result on the display unit.

Further features of the present disclosure will become apparent from the following description of exemplary embodiments (with reference to the attached drawings).

DESCRIPTION OF THE EMBODIMENTS

Preferred embodiments of the present disclosure will be explained below in detail with reference to the accompanied drawings.

(Basic Configuration of a Digital Camera 100)

Figure 1:
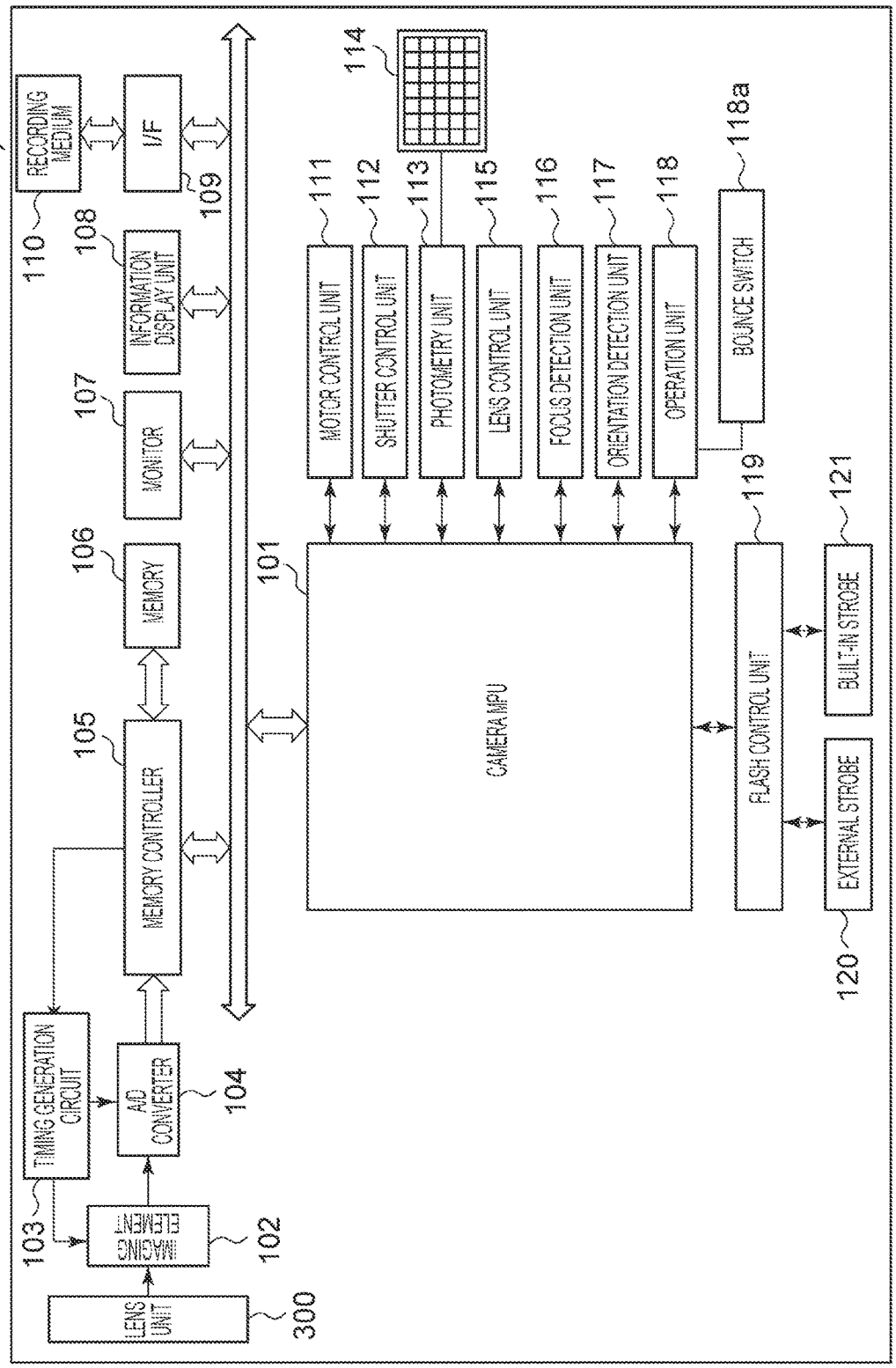
FIG. 1 is a block diagram of a configuration example of a digital camera 100 as an imaging apparatus according to an embodiment of the present disclosure.

The digital camera (hereinafter, called simply camera) 100 as an imaging apparatus according to the embodiment of the present disclosure will be explained with reference to FIG. 1. FIG. 1 is a block diagram of a configuration example of a digital camera 100 as an imaging apparatus according to an embodiment of the present disclosure.

The camera 100 is an imaging apparatus that is connectable to an external flash 120 including a flash unit 208 capable of changing the direction of illumination and is capable of imaging using the external flash 120 (flash imaging). A configuration of the external flash 120 will be described later in detail.

A camera MPU 101 is a micro controller (camera control unit) for controlling comprehensively the entire operation of the camera 100. An imaging element 102 is a charge accumulation-type solid-state imaging element such as a CCD or a CMOS that converts light flux of the subject guided via a lens unit 300 described later into an electrical signal. A timing signal generation circuit 103 is a timing generation unit that generates a timing signal required for operation of the imaging element 102. An A/D converter 104 is a conversion unit that converts analog image data output from the imaging element 102 into digital image data. A memory controller 105 is a memory control unit that controls reading from and writing into a memory 106 and a refreshing operation of the memory 106.

A monitor 107 is a first display unit that is composed of a TFT-type LCD (thin-film transistor drive liquid crystal display) displaying image data stored in the memory 106 and the like. The monitor 107 displays analog image data for display converted from the digital image data by a D/A converter (not illustrated).

An information display unit 108 is a second display unit (display unit) that includes an LCD (liquid crystal display) displaying a result of photometry of the subject and information about the operation of the external flash 120 described later. Various controls (display controls) such as changing and updating display related to the information display unit 108 are executed by the camera MPU 101. The details of the display controls of the information display unit 108 will be mentioned in the following explanation of a photometry display control.

An interface (I/F) 109 is an interface for use in connection with a recording medium 110 such as a memory card or a hard disc. A motor control unit 111 is a control unit that controls a motor not illustrated according to a signal from the camera MPU 101 to control the position of a mirror not illustrated for changing an optical path of light flux entered via the lens unit 300 described later. When the mirror is in the up position, the light flux entered via the lens unit 300 is guided to the imaging element 102, and when the mirror is in the down position, the light flux entered via the lens unit 300 is guided to a photometry sensor 114 and a finder (not illustrated).

A shutter control unit 112 is a shutter control unit that controls a shutter not illustrated arranged in front of the imaging element 102 to switch the imaging element 102 between a light-shielding state and an exposure state according to a signal from the camera MPU 101.

A photometry unit 113 is a camera photometry unit (photometry unit) that performs photometry of the subject. In the embodiment, the photometry unit 113 outputs to the camera MPU 101 photometric values of the areas based on the output from the photometry sensor 114 in which an image-pickup range is divided into a plurality of areas. The camera MPU 101 performs exposure calculations for determining exposure control values for imaging such as AV (aperture value), TV (shutter speed), and ISO (imaging sensitivity) based on the acquired photometric values in the areas.

In the embodiment, the photometry sensor 114 is provided separately from the imaging element 102 to execute photometry. Alternatively, the present disclosure may be configured such that photometry is executed based on the output from the imaging element 102.

The camera MPU 101 controls the information related to the calculated exposure control values to be displayed on the information display unit 108 for each photometry operation of the camera 100, at a time other than a period of time during which a predetermined operation is executed using the external flash 120 described above.

A lens control unit 115 is a lens control unit that controls a lens drive motor and an aperture drive motor not illustrated according to a signal from the camera MPU 101 to perform focus adjustment and aperture adjustment of the lens unit 300.

A focus detection unit 116 is a focus detection unit that detects a defocus amount at each AF point based on output from a focus detection sensor (not illustrated) including a plurality of AF points within the image pickup range, and outputs the detection result to the camera MPU 101. Then, the camera MPU 101 gives an instruction for causing the lens control unit 115 to execute a focus adjusting operation based on the defocus amount output from the focus detection unit 116. An orientation detection unit 117 is an orientation detection unit that includes an acceleration sensor and the like to detect the orientation of the camera 100 relative to the direction of the barycenter.

An operation unit 118 is an operation unit that includes a power button and a release button not illustrated, and a bounce switch 118a to accept an operation input from the user. The release button is an operation unit that is switched by the user between a SW1 state (for example, half press) and a SW2 state (for example, full press) and an operation that accepts an instruction for starting an imaging preparation operation and an imaging operation. In response to the switching of the release button to the SW1 state, the camera MPU 101 starts imaging preparation operations such as a focus detection operation and a photometry operation. In addition, in response to the switching of the release button to the SW2 state, the camera MPU 101 starts an imaging operation of the subject using the imaging element 102.

The bounce switch 118a is an operation unit that accepts an instruction for starting an operation by the external flash 120 described later to change the direction of radiation of the flash unit 208 toward a plurality of different directions (hereinafter, called auto-bounce operation). When the bounce switch 118a is operated by the user, the auto-bounce operation is started according to the instruction from a strobe MPU 201. The details of the auto-bounce operation will be mentioned in the following explanation of the auto-bounce operation.

A flash control unit 119 is a flash control unit that controls the amount of light emission, the light emission pattern, and the like at the time of imaging using the external flash 120 or a built-in strobe 121 described later. The flash control unit 119 can execute a control to switch between the external flash 120 and the built-in strobe 121 to which the control according to a signal from the camera MPU 101 is applied.

The flash control unit 119 also serves as a communication control unit that controls communications between the camera MPU 101 (camera body side) and the strobe MPU 201 (external flash 120 side). In the embodiment, based on the result of the communications between the camera 100 side and the external flash 120 side under the control of the flash control unit 119, the camera MPU 101 determines whether the external flash 120 is performing the auto-bounce operation described later. The details will be mentioned in the following explanation of a photometry display control.

The lens unit 300 is an imaging lens unit that includes various lens groups such as focus lens, zoom lens, shift lens. The camera 100 according to the embodiment of the present disclosure is configured such that the camera body and the lens unit 300 are integrally provided. Alternatively, the camera 100 may be configured such that the camera body and the lens unit are separately provided.

Figure 2:
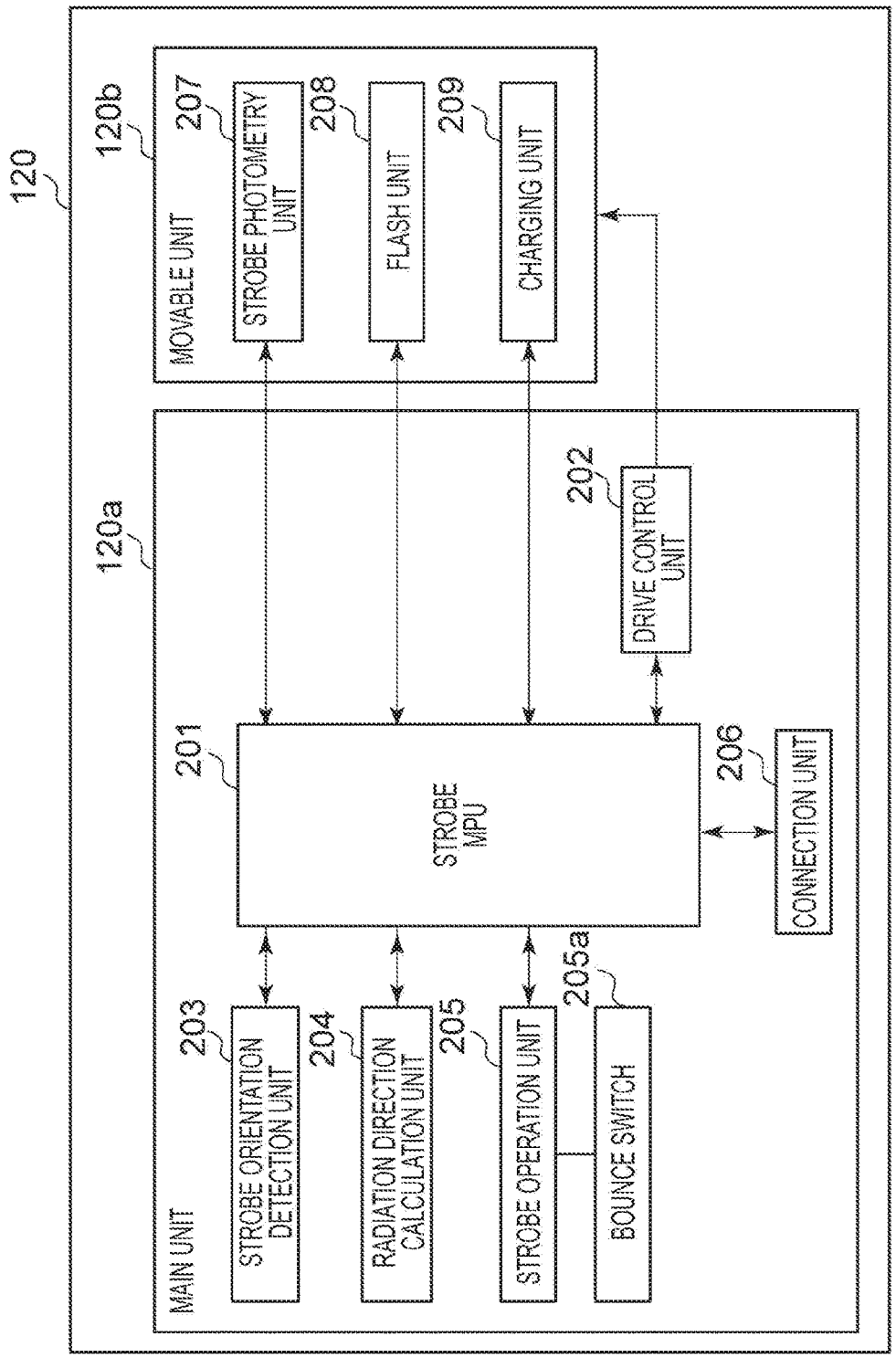
FIG. 2 is a block diagram of a configuration example of an external flash 120 as an illumination apparatus according to the embodiment of the present disclosure.

Next, a configuration of the external flash 120 as an illumination apparatus will be explained with reference to FIG. 2. FIG. 2 is a block diagram of a configuration example of the external flash 120 as an illumination apparatus according to the embodiment of the present disclosure.

The external flash (external strobe light) 120 includes a main unit 120a that has an attachment portion for attachment to the camera body and a movable unit 120b that is held controllably in longitudinal (vertical) and lateral (horizontal) directions relative to the main unit 120a. The mechanism for holding the movable unit 120b controllably in the longitudinal and lateral directions relative to the main unit 120a may be any publicly known mechanism. For example, the mechanism may be as described in Japanese Patent Laid-Open No. 63-204238 or Japanese Patent Laid-Open No. 2011-137960.

The main unit 120a includes the strobe MPU 201, a drive control unit 202, a strobe orientation detection unit 203, a radiation direction calculation unit 204, a strobe operation unit 205, and a connection unit 206. The movable unit 120b includes a strobe photometry unit 207, a flash unit 208, and a charging unit 209.

The strobe MPU 201 is a strobe control unit that controls comprehensively the operation of the external flash 120. The drive control unit 202 is a strobe drive control unit that controls a motor not illustrated according to a signal from the strobe MPU 201 to control driving of the movable unit 120b in the longitudinal and lateral directions relative to the main unit 120a. That is, the drive control unit 202 controls driving of the units of the external flash 120 related to the auto-bounce operation.

The drive control unit 202 acquires the drive amount of the movable unit 120b relative to the main unit 120a with the use of an encoder (not illustrated), and outputs the same to the strobe MPU 201. The foregoing drive amount refers to the drive amount relative to the reference position of the external flash 120 as illustrated in FIG. 3.

Figure 3:
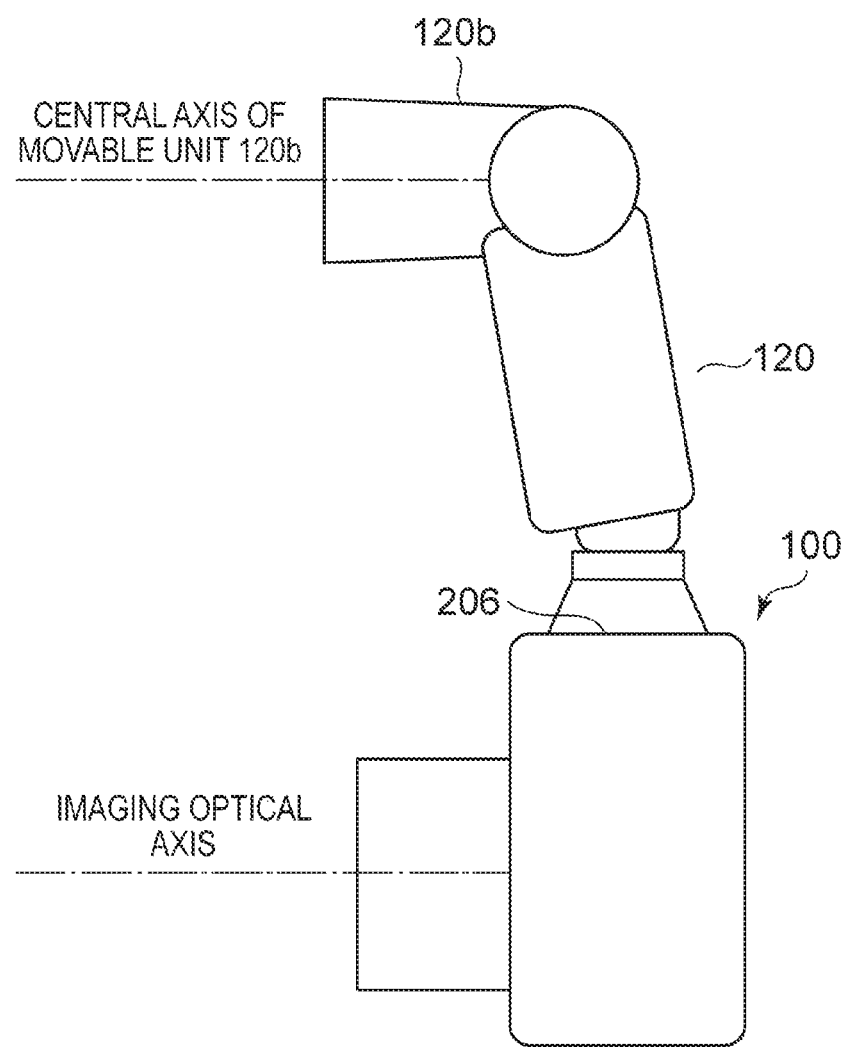
FIG. 3 is a diagram illustrating a reference position of the external flash 120 according to the present disclosure.

FIG. 3 is a diagram illustrating the reference position of the external flash 120 according to the present disclosure. As illustrated in FIG. 3, while the external flash 120 is attached to the camera body, the reference position of the external flash 120 is set at a position in which the central axis of the movable unit 120b and the imaging optical axis of the lens unit 300 do not cross each other.

The strobe orientation detection unit 203 is an orientation detection unit for strobe that includes an acceleration sensor and the like to detect the orientation of the main unit 120a. The radiation direction calculation unit 204 is a bounce angle calculation unit that calculates the optimum radiation direction for imaging using the external flash 120 with auto-bounce operation (bounce flash imaging), based on the orientation of the main unit 120a detected by the strobe orientation detection unit 203, photometric values acquired by the strobe photometry unit 207 described later, and the like. Specifically, when the user gives an instruction for starting the auto-bounce operation, the radiation direction calculation unit 204 calculates the position of the movable unit 120b where the radiation direction of the flash unit 208 becomes an optimum direction for bounce flash imaging using the external flash 120.

The strobe operation unit 205 is an operation unit on the strobe side that includes a power switch and a bounce switch 205a on the external flash 120 side. When the bounce switch 118a on the camera body side and the bounce switch 205a on the external flash 120 side operate differently from each other according to an operation, the operation of the bounce switch 118a of the external flash 120 may be executed on a priority basis, for example.

The connection unit 206 is a connection unit that is provided with an attachment portion for attachment of the external flash 120 to the camera body and a communication contact. The external flash 120 can communicate with the camera body side via the connection unit 206.

The strobe photometry unit 207 is a strobe photometry unit (photometry unit) that includes a light-receiving sensor and performs photometry on reflection light from an object (radiation target) by pre-flashing of the flash unit 208.

The light-receiving surface of the light-receiving sensor is oriented in the same direction as the radiation direction of the flash unit 208. The strobe photometry unit 207 outputs a signal corresponding to light flux received by the light-receiving sensor to the strobe MPU 201. The strobe MPU 201 calculates the distance from the radiation surface of the flash unit 208 to the radiation target based on a signal output from the strobe photometry unit 207. The orientation and position of the light-receiving sensor are not limited to the foregoing examples but the light-receiving sensor may be configured in such a manner that reflection flux from the radiation target is received via a light-guiding member of optical fiber or the like with an optical incidence surface oriented in the same direction as the radiation direction of the flash unit 208.

The flash unit 208 is a flash unit that uses a flash discharge tube or an LED as a light source and includes an radiation surface formed from a resin or the like in front of the light source. The flash unit 208 is capable of emitting light according to a flash signal from the strobe MPU 201. That is, the strobe MPU 201 performs a control related to the emission of the flash unit 208.

The charging unit 209 is a charging unit that has a condenser accumulating energy that causes the flash unit 208 to emit light, a booster circuit for charging the condenser, and the like. The charging unit 209 performs a charging control of the condenser according to a charging instruction signal from the strobe MPU 201. The charging unit 209 also measures a charging voltage of the condenser and outputs the measurement result of the discharge voltage to the strobe MPU 201. The basic configuration of the camera 100 is as described above.

(Auto-Bounce Operation)

Figure 4:
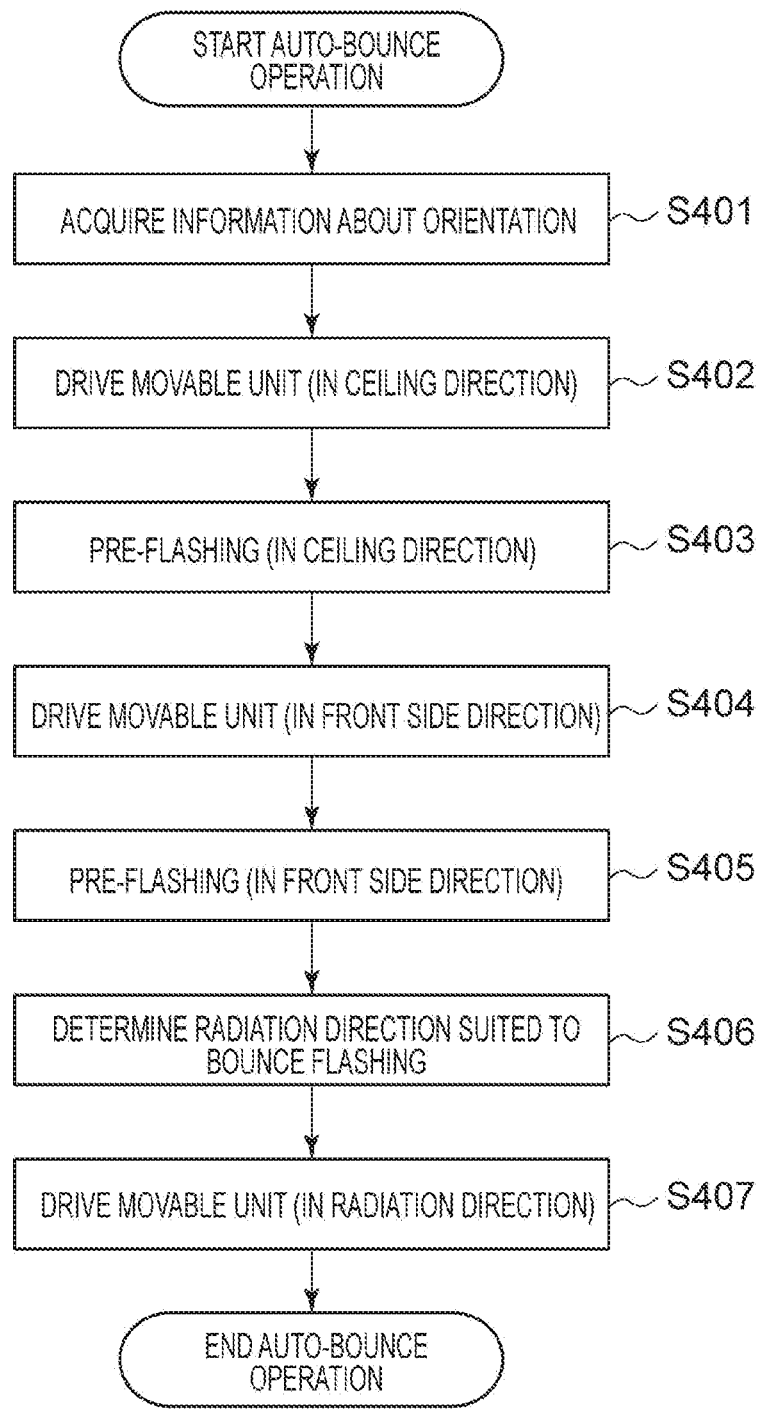
FIG. 4 is a flowchart of an auto-bounce operation according to the embodiment of the present disclosure.

A first auto-bounce operation (full automatic bounce operation) by the external flash 120 will be explained below with reference to FIG. 4. FIG. 4 is a flowchart of the auto-bounce operation according to the embodiment of the present disclosure. The following description is based on the assumption that power is supplied to the units of the external flash 120 and an instruction for starting the auto-bounce operation is given by the user with the use of the bounce switch on the camera body side or the external flash 120 side.

With the instruction for the start of the first auto-bounce operation, at step S401, the strobe MPU 201 acquires information about the orientation of the main unit 120a from the strobe orientation detection unit 203. The information about the orientation of the main unit 120a refers to inclinations of the main unit 120a in the front-back direction and the right-left direction with reference to the orientation (normal position) of the external flash 120 while the connection unit 206 is oriented in the direction of the barycenter.

Next, at step S402, the strobe MPU 201 instructs the drive control unit 202 to drive the movable unit 120b such that the radiation direction of light from the flash unit 208 is opposite (the direction of the ceiling) to the direction of the barycenter.

Next, at step S403, the strobe MPU 201 causes the flash unit 208 to perform pre-flashing while the radiation direction of the flash unit 208 is parallel to the direction of the ceiling. In this state, the strobe MPU 201 instructs the strobe photometry unit 207 to execute photometry on the strobe side to acquire range information from the flash unit 208 to the ceiling based on the photometric values obtained by the photometry.

The range information from the flash unit 208 to the object can be calculated based on the photometric values in the case where the preset object with a predetermined reflectance ratio is positioned at a predetermined distance and the difference between the assumed photometric values and the actual photometric values. In this example, the light flux received by the strobe photometry unit 207 is light flux radiated from the flash unit 208 and reflected on the object. Accordingly, the optical path length of the light flux received by the strobe photometry unit 207 does not match with the doubled distance from the flash unit 208 to the object. However, the position difference between the light-receiving sensor of the strobe photometry unit 207 and the flash unit 208 exerts little influence on the radiation direction of light from the flash unit 208. Therefore, the range information is calculated on the assumption that the positions of the light-receiving sensor of the strobe photometry unit 207 and the flash unit 208 are approximately the same.

Next, at step S404, the strobe MPU 201 instructs the drive control unit 202 to drive the movable unit 120b such that the radiation direction of the flash unit 208 is parallel to the direction of the front side (the direction of the subject). In the external flash 120, the radiation direction of the flash unit 208 is in the direction of the front side when the main unit 120a is oriented at the normal position and the movable unit 120b is at the reference position.

Next, at step S405, the strobe MPU 201 causes the flash unit 208 to perform pre-flashing while the radiation direction of the flash unit 208 is in the direction of the front side. In this state, the strobe MPU 201 instructs the strobe photometry unit 207 to execute photometry on the strobe side to acquire range information from the flash unit 208 to the subject based on the photometric values obtained by the photometry. The range information from the flash unit 208 to the object is calculated by the same method as at step S403 and descriptions thereof will be omitted.

Next, at step S406, the strobe MPU 201 instructs the radiation direction calculation unit 204 to calculate (determine) the radiation direction of the flash unit 208 suited to bounce flash imaging. Specifically, at step S406, the radiation direction calculation unit 204 calculates the radiation direction (bounce angle) of light from the flash unit 208 based on the information about the orientation of the main unit 120*a* and the information about the distance from the flash unit 208 to the object.

As a method for calculating the radiation direction of the flash unit 208, the radiation direction is determined by the following equation (1) on the assumption that the distance from the flash unit 208 to the ceiling is designated as d, the distance to the subject is designated as D, and the angle of the movable unit 120*b* relative to the main unit 120*a* corresponding to the radiation direction of the flash unit 208 suited to bounce flashing is designated as θ:

$$\theta = \tan^{-1}(2/D) \quad (1)$$

The angle determined by the foregoing equation (1) is an angle with the orientation of the external flash 120 at the normal position. Therefore, when the orientation of the external flash 120 is at a position other than the normal position, the illumination direction of the flash unit 208 is corrected to be suited to bounce flashing according to the result of the detection by the strobe orientation detection unit 203.

Next, at step S407, the strobe MPU 201 instructs the drive control unit 202 to drive the movable unit 120*b* such that the radiation direction of the flash unit 208 is aligned to the direction determined at step S406. The first auto-bounce operation (full automatic bounce operation) according to the first embodiment of the present disclosure is as described above.

Besides the foregoing first auto-bounce operation (first operation), the external flash 120 can perform a second auto-bounce operation (second operation: semi-automatic bounce operation) in which the radiation direction of the flash unit 208 is automatically changed without emitting light.

In the embodiment, at least an operation of multiple emissions by the flash unit 208 while changing automatically the radiation direction to a plurality of different directions is defined as the first auto-bounce operation. In addition, in the embodiment, an operation of changing automatically the radiation direction without emission by the flash unit 208 is defined as the second auto-bounce operation. However, the auto-bounce operations are not limited to them. The first operation and the second operation include at least the state in which the changing of the radiation direction (bounce angles) of the external flash 120 is started according to the instruction for starting the auto-bounce operation from the user. Therefore, for example, even when the auto-bounce operation is stopped, it is possible to execute an accurate display control and the like based on the presence or absence of execution of the auto-bounce operation.

The first auto-bounce operation and the second auto-bounce operation are different in whether the emission by the flash unit 208 is included during the changing of the radiation direction of the flash unit 208. In the following explanation, unless otherwise specified, the external flash 120 executes the first auto-bounce operation as the auto-bounce operation.

First Embodiment (Photometry Display Control Operation)

An imaging operation of the camera 100 according to the embodiment will be explained below with reference to FIGS. 5 and 6. The camera 100 is configured to display on the information display unit 108 information about the photometry result of each photometry by the photometry unit 113. In the embodiment, the information about the photometry result on the camera side is defined as information about exposure corresponding to the photometry result. More specifically, the exposure control values based on the photometric values acquired by the photometry unit 113 and the exposure difference information indicative of the differences between the exposure control values manually set by the user and the exposure control values corresponding to the photometric values calculated by the photometry unit 113 are defined as information about the photometry result.

Figure 5A:
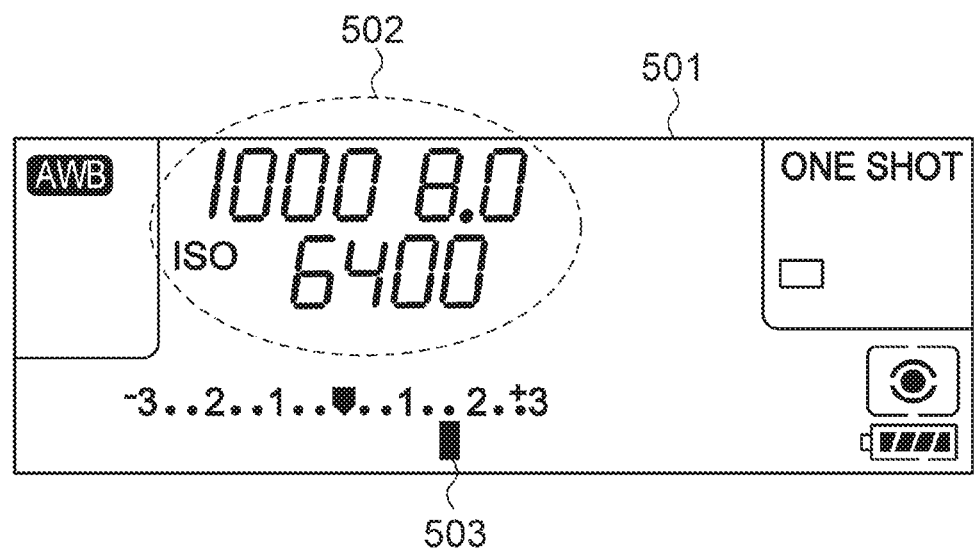
FIGS. 5A and 5B are diagrams illustrating the contents of display on an information display unit 108 according to the first embodiment of the present disclosure.
Figure 5B:
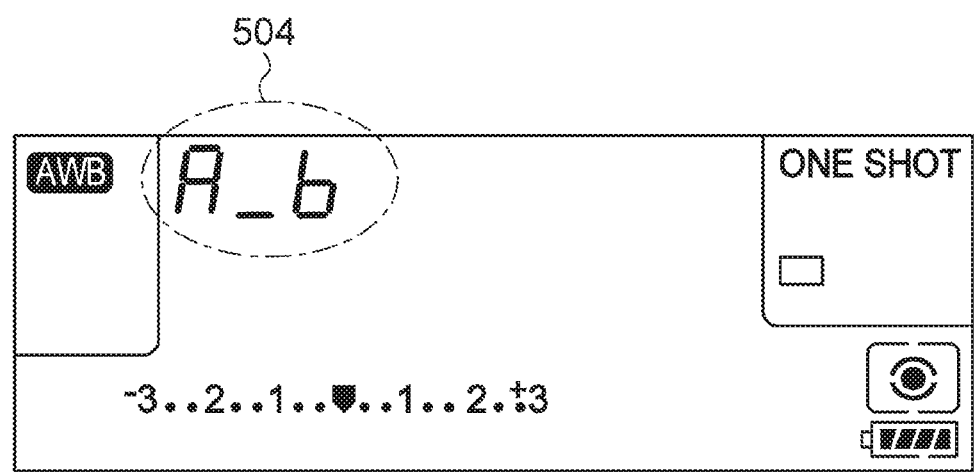

FIGS. 5A and 5B are diagrams illustrating the contents of display on the information display unit 108 according to the first embodiment of the present disclosure. FIG. 5A illustrates the state in which the information about the photometry result is displayed on the information display unit 108, and FIG. 5B illustrates the state in which the information indicating that the auto-bounce operation is being performed is displayed on the information display unit 108.

When the photometry unit 113 performs photometry, as illustrated in FIG. 5A, an exposure control value 502 or exposure difference information 503 is displayed as the information about the photometry result of the photometry on a display surface 501 of the information display unit 108.

The exposure control value 502 includes not only actual exposure control values (aperture value, shutter speed, and imaging sensitivity) corresponding to the photometric values acquired by the photometry unit 113 but also icons related to the exposure control values (for example, "ISO" illustrated in FIG. 5A and others).

By displaying the information about the photometry result explained above on the information display unit 108, the camera 100 of the embodiment can provide the information about the photometry result to the user.

However, when the first auto-bounce operation (first operation) of the external flash 120 is executed, the flash unit 208 performs pre-flashing in the ceiling direction and the front side direction along with the driving of the movable unit 120*b* at a timing not intended on the camera side. Therefore, when the auto-bounce operation is executed during the photometry of the subject by the photometry unit 113, the photometric values acquired by the photometry unit 113 varies due to the driving of the movable unit 120*b* and the pre-flashing of the flash unit 208 without intention on the camera side.

In this case, the information about the photometry result displayed on the information display unit 108 also varies with each pre-flashing of the flash unit 208. Therefore, the information about the photometry result displayed on the information display unit 108 varies unnaturally during the period of time between the instant when the user gives an instruction for starting the auto-bounce operation and the instant when the radiation direction of the flash unit 208 is actually changed to the direction suited to the bounce flashing. In addition, unlike the pre-flashing operation with the calculation of the amount of light emission, the photometry during the first auto-bounce operation is executed not depending on the control of the camera side (camera MPU 101), and therefore it is unknown for the camera side at what timing the pre-flashing with the auto-bounce operation will be performed.

That is, the external flash 120 performs automatically the auto-bounce operation according to the instruction from the user, and it is difficult for the user and the camera side to recognize accurately the timing for pre-flashing of the flash unit 208. In this case, the information about the photometry result to be notified to the user varies unnaturally due to the pre-flashing with the first auto-bounce operation, which gives the user an unpleasant sensation.

Accordingly, in the embodiment, the foregoing problem is handled by performing a display control of the information about the photometry result (hereinafter, called photometry display control) under which the information about the photometry result obtained by the photometry of the subject is not displayed during the first auto-bounce operation of the external flash 120. The details will be explained below with reference to FIG. 6.

Figure 6:
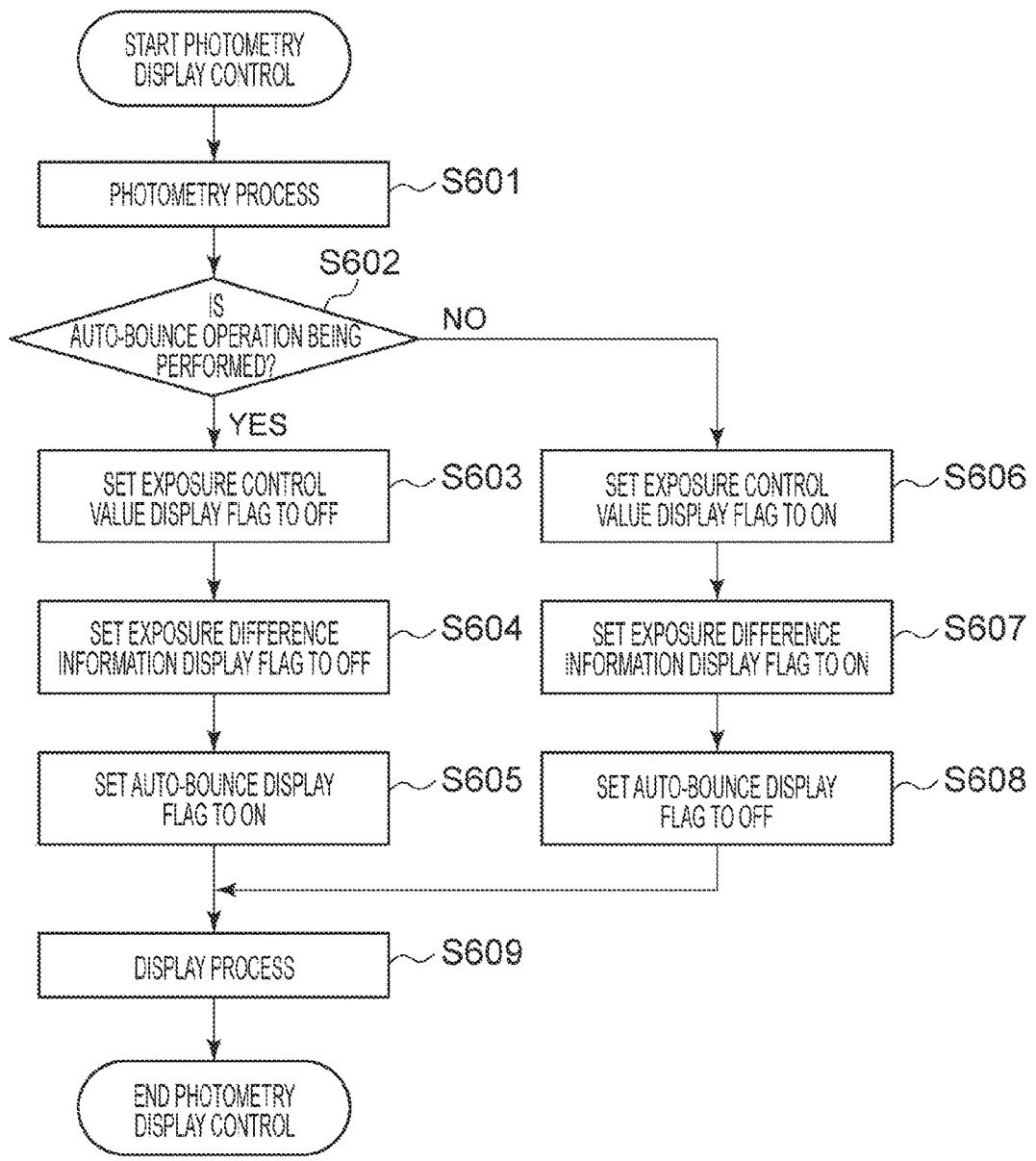
FIG. 6 is a flowchart of a photometry display control according to the first embodiment of the present disclosure.

FIG. 6 is a flowchart of the photometry display control according to the first embodiment of the present disclosure. The following explanation is based on the assumption that the photometry operation is started responsive to turning of the release button to the SW1 state by the user (providing the instruction for imaging preparation). However, the photometry display control of the embodiment is not limited to this. The camera 100 of the embodiment is configured at least to perform the photometry display control according to a predetermined operation including the photometry. In the following explanation with reference to FIG. 6, the first auto-bounce operation will be called simply auto-bounce operation.

The camera MPU 101 starts the photometry display control responsive to turning of the release button to the SW1 state. At step S601, the photometry unit 113 acquires the photometric values of the areas based on the output of the photometry sensor 114 and outputs the same to the camera MPU 101.

Upon completion of the photometry, at step S602, the camera MPU 101 determines whether the external flash 120 is performing the auto-bounce operation. This process will be specifically explained. Upon completion of the photometry, the camera MPU 101 transmits a signal for verifying the status of the external flash 120 to the strobe MPU 201 via the flash control unit 119. Upon receipt of the signal for verifying the status, the strobe MPU 201 transmits a status signal about its operating status to the camera MPU 101. For example, when the external flash 120 is performing the auto-bounce operation, the strobe MPU 201 transmits the status signal indicative of that status to the camera MPU 101. When the external flash 120 is performing an operation other than the auto-bounce operation, the strobe MPU 201 transmits the status signal indicative of that status to the camera MPU 101. Then, the camera MPU 101 determines whether the external flash 120 is performing the auto-bounce operation based on the status signal received from the strobe MPU 201.

When determining that the auto-bounce operation is being performed (YES at step S602), the camera MPU 101 sets an exposure control value display flag to OFF at step S603. The exposure control value display flag is information for making a setting as to whether the exposure control value 502 as illustrated in FIG. 5A is to be displayed on the information display unit 108 in display processing described later.

Next, at step S604, the camera MPU 101 sets an exposure difference information display flag to OFF. The exposure difference information display flag is information for making a setting as to whether the exposure difference information 503 as illustrated in FIG. 5A is to be displayed on the information display unit 108 in the display processing described later. The exposure difference information display flag may be configured to be set to ON only when the user sets manually the exposure control values.

Next, at step S605, the camera MPU 101 sets an auto-bounce display flag to ON. The auto-bounce display flag is information for making a setting as to whether auto-bounce information 504 indicated by "A b" as illustrated in FIG. 5B is to be displayed on the information display unit 108 in the display processing described later. Upon completion of the auto-bounce operation of the external flash 120, the display of the auto-bounce information 504 on the information display unit 108 is terminated and the auto-bounce information is brought into the non-display state.

Next, when determining that the auto-bounce operation is not being performed (NO at step S602), the camera MPU 101 sets the exposure control value display flag to ON at step S606. Next, at step S607, the camera MPU 101 sets the exposure difference information display flag to ON. Then, at step S608, the camera MPU 101 sets the auto-bounce display flag to OFF. The display flags explained above are recorded in the memory 106 and are read out by the camera MPU 101 at the timing for the display processing.

After setting the display flags to ON or OFF at the foregoing steps, the camera MPU 101 reads the display flags recorded in the memory 106 at step S609. Then, the camera MPU (display control unit) 101 controls whether the information about the photometry result and the information about the operation of the external flash 120 (auto-bounce information) are to be displayed on the information display unit 108 based on the read display flags.

When the result of the determination at step S602 is YES (the auto-bounce operation is being performed), the exposure control value display flag and the exposure difference information flag are set to OFF, and the auto-bounce display flag is set to ON. Therefore, in this case, the camera MPU 101 executes the display control of the information display unit 108 such that the exposure control value 502 and the exposure difference information 503 are not displayed but the auto-bounce information 504 is displayed.

When the result of the determination at step S602 is NO (the auto-bounce operation is not being performed), the exposure control value display flag and the exposure difference information display flag are set to ON and the auto-bounce display flag is set to OFF. Therefore, in this case, the camera MPU 101 executes the display control of the information display unit 108 such that the exposure control value 502 and the exposure difference information 503 are displayed but the auto-bounce information 504 is not displayed. The photometry display control of the embodiment is as described above.

In the photometry display control, the camera MPU 101 may execute the display processing based on not only the display flags but also the current setting and operation status of the camera 100. For example, when the camera 100 is set so as not to display anything on the information display unit 108, all the display flags are set to OFF. In addition, when the auto-bounce operation is not being performed but the camera 100 is executing a predetermined operation requiring display of predetermined information on the information display unit 108, the camera MPU 101 sets the exposure control value display flag and the exposure difference information display flag to OFF. The predetermined operation may be an operation of setting exposure with a fixed amount of light emission from the flash unit 208, an operation of causing the flash unit 208 to emit light intermittently and continuously to verify the shadowing effect on the subject, and the like, for example.

As explained above, the camera 100 of the embodiment is configured so as not to display the exposure control value 502 or the exposure difference information 503 when it is determined that the first auto-bounce operation is being performed at the time of photometry of the subject on the camera side. According to this configuration, it is possible to prevent the photometry result displayed on the information display unit 108 from varying unnaturally due to multiple pre-flashes during the first auto-bounce operation or the like. Therefore, the camera 100 of the embodiment can suppress unnatural variation of the information about the photometry result to be notified to the user when the radiation direction of the illumination apparatus is automatically changed.

The camera MPU 101 is configured to determine whether the external flash 120 is performing the first auto-bounce operation based on the result of communications between the camera 100 and the external flash 120. According to this configuration, it is possible to control accurately display of the information about the photometry result on the information display unit 108 along with the period of time from the start to end of the first auto-bounce operation of the external flash 120.

In addition, the camera 100 of the embodiment is configured to display the auto-bounce information 504 on the display unit when it is determined that the auto-bounce operation is being performed. According to this configuration, the user can easily know that the external flash 120 is performing the auto-bounce operation. In other words, the user can easily know that the driving of the movable unit 120b is completed and the radiation direction of the flash unit 208 is set to the direction suited to the bounce flashing by the auto-bounce operation, and therefore the bounce flash imaging can be executed without failure.

Second Embodiment

Figure 7:
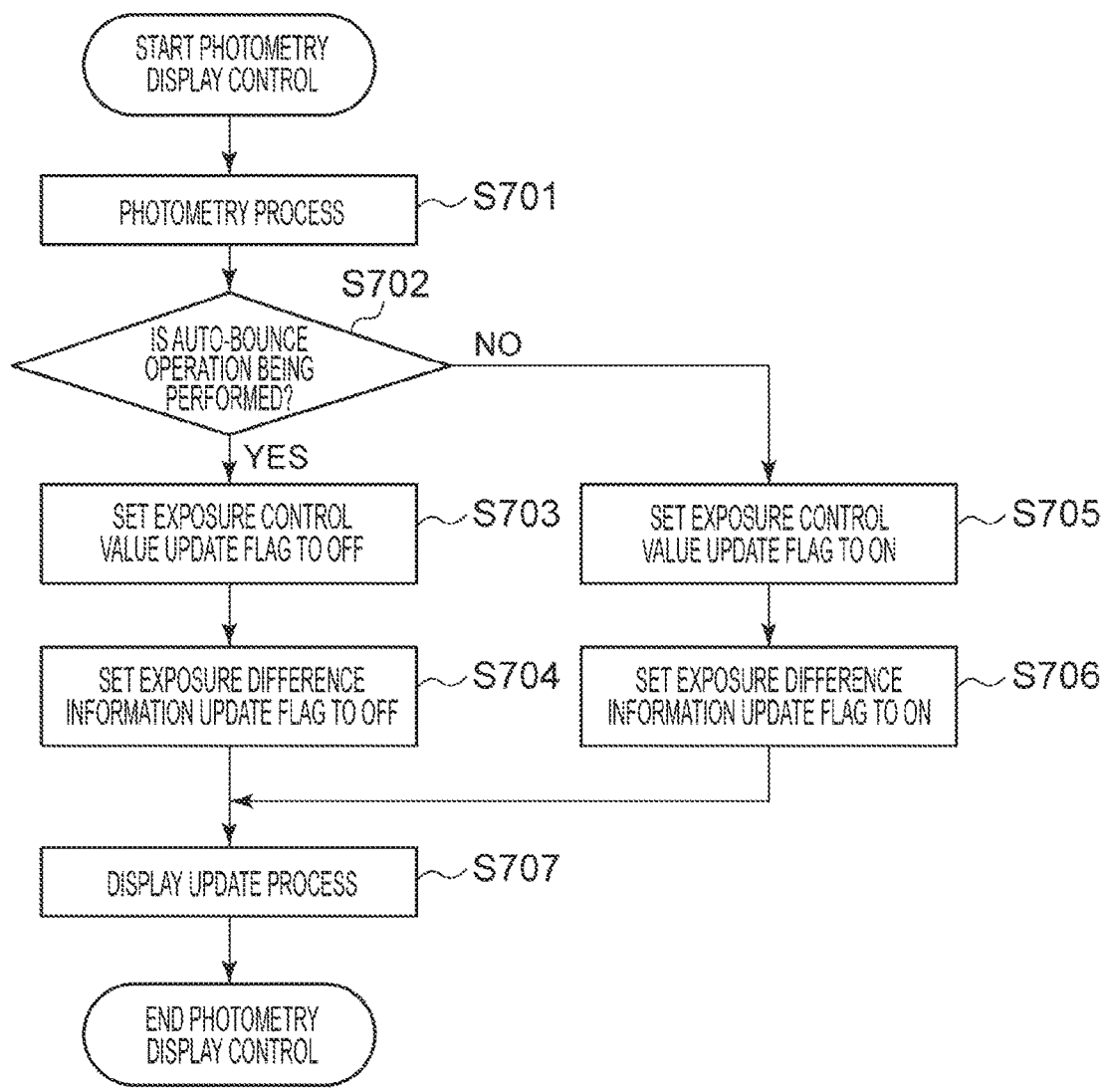
FIG. 7 is a flowchart of a photometry display control according to a second embodiment of the present disclosure.

A camera 100 of a second embodiment of the present disclosure will be explained with reference to FIG. 7. FIG. 7 is a flowchart of a photometry display control according to the second embodiment of the present disclosure. The camera MPU 101 starts a photometry display control responsive to turning of the release button to the SW1 state. The processing at steps S701 and S702 is identical to that at steps S601 and S602 in the first embodiment explained above, and descriptions thereof will be omitted. In the following explanation with reference to FIG. 7, the first auto-bounce operation will be called simply auto-bounce operation.

When determining that the auto-bounce operation is being performed (YES at step S702), the camera MPU 101 sets an exposure control value update flag to OFF at step S703. The exposure control value update flag is information for making a setting as to whether the display of the exposure control value 502 on the information display unit 108 is to be updated in a display updating process described later.

Next, at step S704, the camera MPU 101 sets an exposure difference information update flag to OFF. The exposure difference information update flag is information for making a setting as to whether the display of the exposure difference information 503 on the information display unit 108 is to be updated in the display updating process described later.

When determining that the auto-bounce operation is not being performed (NO at step S702), the camera MPU 101 sets the exposure control value update flag to ON at step S705. Next, at step S706, the camera MPU 101 sets the exposure difference information update flag to ON. The foregoing update flags are recorded in the memory 106 and read out by the camera MPU 101 at the timing for the display updating process.

After setting the display flags to ON or OFF at the foregoing steps, the camera MPU 101 reads the update flags recorded in the memory 106 at step S707. Then, the camera MPU 101 performs a control on whether the display of the information about the photometry result is to be updated by the information display unit 108 based on the read update flags.

When the result of the determination at step S702 is YES (the auto-bounce operation is being performed), the exposure control value update flag and the exposure difference information update flag are set to OFF. Therefore, in this case, the camera MPU 101 executes the display control of the information display unit 108 so as not to update the display of the exposure control value 502 and the exposure difference information 503. Specifically, the camera MPU 101 performs the control such that the display corresponding to the information about the photometry result acquired by the photometry display control is not updated but the display of the information about the photometry result being displayed is maintained.

Therefore, when the information about the photometry result is displayed on the information display unit 108 at the start of the photometry display control being currently performed, the display of the information about the photometry result is maintained. When the information about the photometry result is not displayed on the information display unit 108 at the start of the photometry display control being currently performed, the information about the photometry result is not displayed on the information display unit 108.

In contrast to this, when the result of the determination at step S702 is NO (the auto-bounce operation is not being performed), the exposure control value update flag and the exposure difference information update flag are set to ON. Therefore, in this case, the camera MPU 101 executes the display control of the information display unit 108 to update the display of the exposure control value 502 and the exposure difference information 503. Specifically, the camera MPU 101 performs the control such that the display corresponding to the information about the photometry result acquired by the photometry display control is updated and the information about the photometry result being displayed is changed.

When the information about the photometry result is not displayed on the information display unit 108 at the start of the photometry display control being currently performed, the display of the information about the photometry result is started on the information display unit 108. The photometry display control of the embodiment is as described above.

As explained above, the camera 100 of the embodiment is configured so as not to update the display of the exposure control value 502 and the exposure difference information 503 when it is determined that the first auto-bounce operation is being performed at the time of photometry of the subject. According to this configuration, as in the first embodiment, it is possible to prevent the photometry result displayed on the information display unit 108 from varying unnaturally during the first auto-bounce operation. Therefore, the camera 100 of the embodiment can suppress unnatural variation of the information about the photometry result to be notified to the user when the radiation direction of the illumination apparatus is automatically changed.

As in the first embodiment, when determining that the auto-bounce operation is being performed in the photometry display control, the camera MPU 101 may display the auto-bounce information on the information display unit 108.

In the embodiment, the update flags are set to OFF during the first auto-bounce operation so that the display of the information about the photometry result on the information display unit 108 is not updated. However, the present disclosure is not limited to this. For example, the camera MPU 101 may be configured so as not to update the display of the information about the photometry result on the information display unit 108 by discarding the information about the photometric values acquired in the photometry processing during the first auto-bounce operation. According to this configuration as well, it is possible to obtain the same effect as in the case where the update flags are set to OFF.

Third Embodiment

Figure 8:
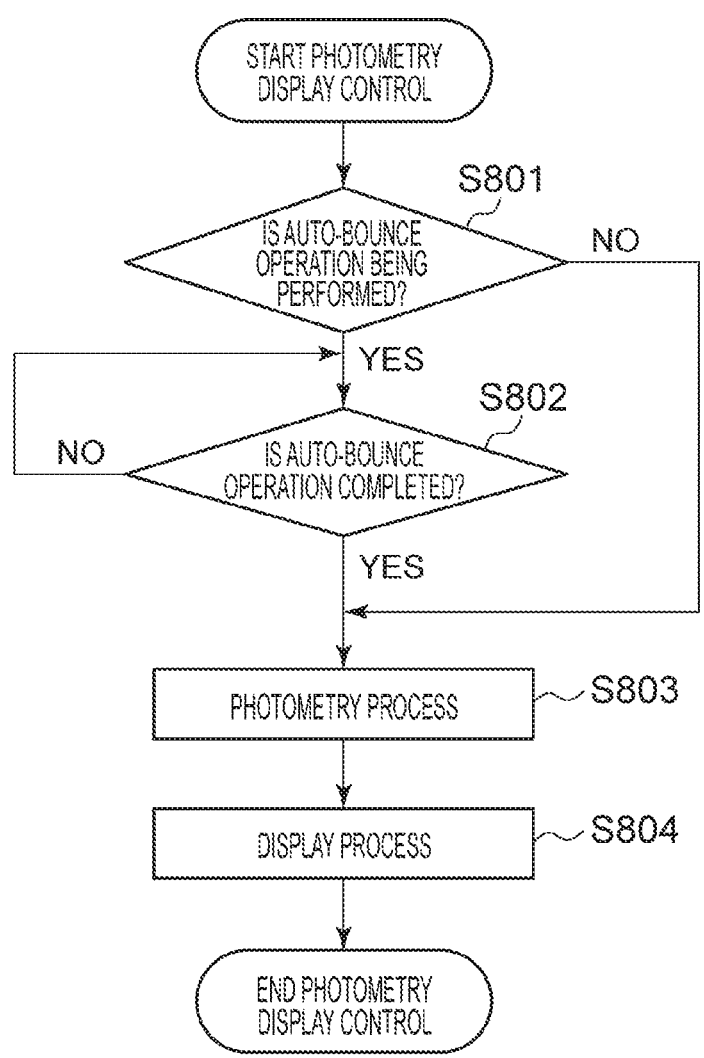
FIG. 8 is a flowchart of a photometry display control according to a third embodiment of the present disclosure.

A camera 100 of a third embodiment of the present disclosure will be described with reference to FIG. 8. FIG. 8 is a flowchart of a photometry display control according to the third embodiment of the present disclosure. The camera MPU 101 starts the photometry display control responsive to turning of the release button to the SW1 state. The processing at step 801 is the same as the processing at step S602 in the first embodiment, and descriptions thereof will be omitted. In the following explanation with reference to FIG. 8, the first auto-bounce operation will be called simply auto-bounce operation.

When determining that the auto-bounce operation is not being performed (NO at step S801), the camera MPU 101 moves to step S803. When determining that the auto-bounce operation is being performed (YES at step S801), the camera MPU 101 moves to step S802.

Next, at step S802, the camera MPU 101 determines whether the auto-bounce operation of the external flash 120 is completed based on a status signal input from the strobe MPU 201. The status signal indicative of completion of the auto-bounce operation is transmitted from the strobe MPU 201 to the camera MPU 101 in time with the completion of the auto-bounce operation. The processing at step S802 is repeated until the camera MPU 101 determines that the auto-bounce operation of the external flash 120 is completed.

Next, at step S803, the photometry unit 113 acquires the photometric values of the areas based on the output of the photometry sensor 114, and outputs the same to the camera MPU 101. Then, at step S804, the camera MPU 101 performs a control such that the exposure control value 502 or the exposure difference information 503 based on the acquired photometric values is displayed on the information display unit 108. The photometry display control of the embodiment is as described above.

As explained above, the camera 100 of the embodiment is configured such that, when it is determined that the external flash 120 is performing the auto-bounce operation upon receipt of an instruction for the photometry of the subject, the photometry process using the photometry unit 113 is not executed until the completion of the auto-bounce operation. In other words, the camera 100 of the embodiment is configured to control the photometry unit 113 so as not to execute photometry using the photometry unit 113 when the camera MPU 101 determines that the auto-bounce operation is being performed.

In this case, since no photometry is newly performed during the auto-bounce operation, it is possible to prevent the photometry result displayed on the information display unit 108 from varying unnaturally. Therefore, the camera 100 of the embodiment can suppress unnatural variation of the information about the photometry result to be notified to the user when the radiation direction of the illumination apparatus is automatically changed.

The preferred embodiments of the present disclosure have been explained so far. However, the present disclosure is not limited to these embodiments but can be modified or changed within the range of the gist of the present disclosure. For example, the foregoing embodiments are configured to display the information about the photometry result on the information display unit 108, but may be configured to display the information on the monitor 107 instead. In addition, the foregoing embodiments may be configured such that an in-finder display unit is provided in the optical path from the lens unit 300 to the finder (not illustrated) via the mirror to display the information about the photometry result on the in-finder display unit. Further, the foregoing embodiments may be configured to display the information about the photometry result on an external monitor outside the camera 100. That is, the display unit according to the embodiments may be any display unit that is allowed to provide the information about the photometry result to the user. Similarly, the information indicating that the external flash 120 is performing the auto-bounce operation may be displayed on a display unit other than the information display unit 108 as illustrated in FIG. 5B.

In the foregoing embodiments, the camera MPU 101 determines in the photometry display control whether the first auto-bounce operation is being performed. However, the present disclosure is not limited to this. For example, the camera MPU 101 may determine in the photometry display control whether an instruction for starting the first auto-bounce operation is given. When it is possible to detect the period of time during which the first auto-bounce operation is to be executed before the start of the first auto-bounce operation, the camera MPU 101 may perform a control such that the information about the photometry result and the like are not displayed for the period of time during which the first auto-bounce operation is performed. That is, the photometry display control according to the embodiments of the present disclosure is configured at least such that the display of the information about the photometry result, the updating of the display of the information about the photometry result, and the photometry operation are not performed during the first auto-bounce operation.

In the foregoing embodiments, when the external flash 120 is performing the first auto-bounce operation, the photometry result is not displayed, the display on the photometry result is not updated, or the photometry is not performed on the camera side. However, the present disclosure is not limited to this. For example, when the external flash 120 is performing the first auto-bounce operation, the information indicating the possibility of incorrect photometric values may be provided to the user (with the use of the information display unit 108 or the monitor 107, for example) while executing the operations restricted in the foregoing embodiments.

In the foregoing embodiments, the external flash 120 performs the first auto-bounce operation. In contrast to this, the case in which the external flash 120 performs the second auto-bounce operation will be explained below.

When the external flash 120 performs the second auto-bounce operation, the angle of the movable unit 120b relative to the main unit 120a set manually by the user is stored, and the movable unit 120b is automatically driven at the stored angle according to the instruction for the auto-bounce operation. In this case, the flash unit 208 does not perform pre-flashing along with the second auto-bounce operation, and the information about the photometry result displayed on the information display unit 108 does not vary unnaturally during the second auto-bounce operation.

Therefore, the photometry display controls of the foregoing embodiments are performed at least while the external flash 120 is performing the first auto-bounce operation as the auto-bounce operation. In other words, when the external flash 120 is performing the first auto-bounce operation, the display of the information about the photometry result on the information display unit 108, the updating of the display, and the photometry operation are not performed.

In contrast to this, when the external flash 120 is performing the second auto-bounce operation, the camera MPU 101 performs a control to display on the information display unit 108 the information indicating that the external flash 120 is performing the auto-bounce operation as illustrated in FIG. 5B. According to the foregoing configuration, even in the situation in which the information about the photometry result does not vary depending on the operation of the external flash 120, it is possible to suppress unnecessary changes in the presence or absence of the display and the updating of the display in the photometry display control, the necessity of the photometry operation, and the like.

In the foregoing embodiments, the aperture value, the shutter speed, the imaging sensitivity, and the like are collectively displayed as the exposure control value 502. Alternatively, the camera MPU 101 may control separately the display of these exposure control values.

Out of the exposure control values 502 displayed on the information display unit 108, the information about the exposure control values settable by the user only through a manual operation does not vary unnaturally along with the auto-bounce operation. Therefore, in the photometry display controls of the foregoing embodiments, out of the information about the photometry result, the information set automatically based on the photometry by the photometry unit 113 may not be displayed or the display may be updated during the auto-bounce operation. In other words, out of the information about the photometry result, the information settable by the user only through a manual operation may be displayed or the display may be updated even during the auto-bounce operation.

The foregoing configuration will be explained specifically. For example, when the image pickup mode of the camera 100 is set to Tv-priority mode or Av-priority mode, only the exposure control values calculated automatically (through photometry) by the camera 100 are not displayed during the auto-bounce operation. In this case, for example, when the image pickup mode of the camera 100 is set to the Av-priority mode, the information about the shutter speed and the imaging sensitivity out of the exposure control value 502 is not displayed and the display of the same is not updated. That is, when the image pickup mode of the camera 100 is set to the Av-priority mode, the information about the aperture value is displayed (continuously displayed) during the auto-bounce operation. According to the foregoing configuration, it is possible to suppress unnatural changes in the information likely to vary unnaturally along with the auto-bounce operation, out of the information about the photometry result.

In the foregoing embodiments, the camera MPU 101, the photometry unit 113, the flash control unit 119, the strobe MPU 201, the radiation direction calculation unit 204, and the like operate in cooperation to control the operation of the camera 100. However, the present disclosure is not limited to this. For example, the program according to the flows described in FIGS. 4 and 6 to 8 may be stored in advance in the memory 106 so that the camera MPU 101 or the like executes the program to control the operation of the camera 100.

The program may be provided in any form such as a program executed by object codes or interpreters, script data supplied to the OS, or the like as far as the program has the functions of the program. In addition, a recording medium for supply of the program may be a hard disc, a magnetic recording medium such as a magnetic tape, or optical/magneto-optical recording medium.

In the foregoing embodiments, a digital camera is taken as an example of the imaging apparatus for carrying out the present disclosure. However, the present disclosure is not limited to this. For example, the present disclosure is also applicable to various imaging apparatuses that are connectable to a flashing device capable of driving automatically the movable unit 120b such as the external flash 120, within the range of the gist of the present disclosure.

Other Embodiments

The present disclosure can be also implemented by performing a process in which a program performing one or more functions of the foregoing embodiments is supplied to a system or an apparatus via a network or a recording medium and one or more processors in a computer of the system or the apparatus read and execute the program. In addition, the present disclosure can also be implemented by a circuit performing one or more functions (for example, ASIC).

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-181246, filed Sep. 14, 2015, which is hereby incorporated by reference herein in its entirety.

What is claimed is:

1. An imaging apparatus which images with the use of an illumination apparatus comprising a flash unit which changes a radiation direction automatically, comprising:
   a photometry unit;
   a display unit configured to display information about a result of photometry using the photometry unit;
   at least one processor and at least one memory functioning as:
   a display control unit configured to execute a control related to display on the display unit, and
   a determination unit configured to determine, based on a received status signal of the illumination apparatus, whether the illumination apparatus is performing a first operation of multiple emissions by the flash unit while changing automatically the radiation direction of the flash unit to a plurality of different directions,
   wherein, when the determination unit determines that the illumination apparatus is performing the first operation, the display control unit performs a control so as not to display the information about the photometry result on the display unit.

2. The imaging apparatus according to claim 1,
   wherein, when the illumination apparatus is performing the first operation, the display control unit performs the control so as not to display information calculated automatically by the imaging apparatus as the information about the photometry result on the display unit.

3. The imaging apparatus according to claim 2,
   wherein, when the illumination apparatus is performing the first operation, the display control unit performs a control to display information set manually by a user on the display unit.

4. The imaging apparatus according to claim 1,
   wherein, when the illumination apparatus is not performing the first operation, the display control unit performs a control to display on the display unit the information about the photometry result according to photometry using the photometry unit.

5. The imaging apparatus according to claim 1,
   wherein, when the illumination apparatus is performing a second operation of changing automatically the radiation direction of the flash unit without emitting light, the display control unit performs a control to display on the display unit the information about the photometry result according to the photometry using the photometry unit.

6. The imaging apparatus according to claim 1,
   wherein, when the illumination apparatus is performing the first operation, the display control unit performs a control to display on the display unit information for notifying that the illumination apparatus is performing the first operation.

7. The imaging apparatus according to claim 1,
   wherein the illumination apparatus is an external illumination apparatus detachable from the imaging apparatus, and
   the first operation of the illumination apparatus is an operation of multiple emissions by the flash unit while the radiation direction of the flash unit is automatically changed to a plurality of different directions not depending on an instruction from the imaging apparatus after the first operation is started according to the instruction from the imaging apparatus.

8. The imaging apparatus according to claim 1,
   wherein the information about the photometry result includes at least one of information about an exposure control value corresponding to the result of photometry using the photometry unit and information about a difference between an exposure control value set by a user and the exposure control value corresponding to the result of photometry using the photometry unit.

9. An imaging apparatus which images with the use of an illumination apparatus comprising a flash unit which changes a radiation direction automatically, comprising:
   a photometry unit;
   a display unit configured to display information about a result of photometry using the photometry unit;
   at least one processor and at least one memory functioning as:
   a display control unit configured to execute a control related to display on the display unit, and
   a determination unit configured to determine, based on a received status signal of the illumination apparatus, whether the illumination apparatus is performing a first operation of multiple emissions by the flash unit while changing automatically the radiation direction of the flash unit to a plurality of different directions,
   wherein, when the determination unit determines that the illumination apparatus is performing the first operation, the display control unit performs a control so as not to update display of the information about the photometry result on the display unit.

10. The imaging apparatus according to claim 9,
    wherein, when the illumination apparatus is performing the first operation, the display control unit performs the control so as not to update display of information automatically calculated by the imaging apparatus as the information about the photometry result on the display unit.

11. The imaging apparatus according to claim 10,
    wherein, when the illumination apparatus is performing the first operation, the display control unit performs a control to update display of information set manually by a user as the information about the photometry result on the display unit.

12. The imaging apparatus according to claim 9,
    wherein, when the illumination apparatus is not performing the first operation, the display control unit performs a control to update display of the information about the photometry result on the display unit according to photometry using the photometry unit.

13. The imaging apparatus according to claim 12,
    wherein, when the illumination apparatus is performing a second operation of changing automatically the radiation direction of the flash unit without emitting light, the display control unit performs a control to update display of the information about the photometry result on the display unit according to the photometry using the photometry unit.

14. The imaging apparatus according to claim 9,
wherein, when the illumination apparatus is performing the first operation, the display control unit performs a control to display information for notifying that the illumination apparatus is performing the first operation.

15. The imaging apparatus according to claim 9,
wherein the illumination apparatus is an external illumination apparatus detachable from the imaging apparatus, and
the first operation of the illumination apparatus is an operation of multiple emissions by the flash unit while the radiation direction of the flash unit is automatically changed to a plurality of different directions not depending on an instruction from the imaging apparatus after the first operation is started according to the instruction from the imaging apparatus.

16. The imaging apparatus according to claim 9,
wherein the information about the photometry result includes at least one of information about an exposure control value corresponding to the result of photometry using the photometry unit and information about a difference between an exposure control value set by a user and the exposure control value corresponding to the result of photometry using the photometry unit.

17. An imaging apparatus which images with the use of an illumination apparatus comprising a flash unit which changes a radiation direction automatically, comprising:
a photometry unit;
a display unit configured to display information about a result of photometry according to photometry using the photometry unit;
at least one processor and at least one memory functioning as:
a photometry control unit configured to perform a control on whether photometry using the photometry unit is to be performed, and
a determination unit configured to determine, based on a received status signal of the illumination apparatus, whether the illumination apparatus is performing a first operation of multiple emissions by the flash unit while changing automatically the radiation direction of the flash unit to a plurality of different directions,
wherein, when the determination unit determines that the illumination apparatus is performing the first operation, the photometry control unit controls the photometry unit so as not to perform the photometry using the photometry unit.

18. The imaging apparatus according to claim 17,
wherein, when the illumination apparatus is performing a second operation of changing automatically the radiation direction of the flash unit without emitting light, the photometry control unit controls the photometry unit to perform the photometry using the photometry unit.

19. The imaging apparatus according to claim 17,
wherein the information about the photometry result includes at least one of information about an exposure control value corresponding to the result of photometry using the photometry unit and information about a difference between an exposure control value set by a user and the exposure control value corresponding to the result of photometry using the photometry unit.

20. The imaging apparatus according to claim 17,
wherein the illumination apparatus is an external illumination apparatus detachable from the imaging apparatus, and
the first operation of the illumination apparatus is an operation of multiple emissions by the flash unit while the radiation direction of the flash unit is automatically changed to a plurality of different directions not depending on an instruction from the imaging apparatus after the first operation is started according to the instruction from the imaging apparatus.

21. A method of controlling an imaging apparatus which images with the use of an illumination apparatus comprising a flash unit which changes a radiation direction automatically, comprising:
displaying information about a photometry result of photometry of a subject on a display unit;
determining whether the illumination apparatus is performing a first operation of multiple emissions by the flash unit while changing automatically the radiation direction of the flash unit to a plurality of different directions, based on a received status signal of the illumination apparatus; and
controlling so as not to display the information about the photometry result on the display unit when the illumination apparatus is performing the first operation.

22. A method of controlling an imaging apparatus which images with the use of an illumination apparatus comprising a flash unit which changes a radiation direction automatically, comprising:
displaying information about a photometry result of photometry of a subject on a display unit;
determining whether the illumination apparatus is performing a first operation of multiple emissions by the flash unit while changing automatically the radiation direction of the flash unit to a plurality of different directions, based on a received status signal of the illumination apparatus; and
controlling so as not to update display of the information about the photometry result on the display unit when the illumination apparatus is performing the first operation.

23. A method of controlling an imaging apparatus which images with the use of an illumination apparatus comprising a photometry unit and a flash unit which changes a radiation direction automatically, comprising:
displaying information about a photometry result on a display unit according to photometry using the photometry unit;
determining whether the illumination apparatus is performing a first operation of multiple emissions by the flash unit while changing automatically the radiation direction of the flash unit to a plurality of different directions, based on a received status signal of the illumination apparatus;
controlling the photometry unit so as not to perform the photometry using the photometry unit when the illumination apparatus is performing the first operation.

24. A non-transitory computer-readable recording medium storing a program for causing a computer to execute a method of controlling an imaging apparatus which images with the use of an illumination apparatus comprising a flash unit which changes a radiation direction automatically, the method controlling the imaging apparatus comprising:
displaying information about a photometry result of photometry of a subject on a display unit;
determining whether the illumination apparatus is performing a first operation of multiple emissions by the flash unit while changing automatically the radiation direction of the flash unit to a plurality of different directions, based on a received status signal of the illumination apparatus; and controlling so as not to display the information about the photometry result on the display unit when the illumination apparatus is performing the first operation.

25. A non-transitory computer-readable recording medium storing a program for causing a computer to execute a method of controlling an imaging apparatus which images with the use of an illumination apparatus comprising a flash unit which changes a radiation direction automatically, the method controlling the imaging apparatus comprising:

displaying information about a photometry result of photometry of a subject on a display unit;

determining whether the illumination apparatus is performing a first operation of multiple emissions by the flash unit while changing automatically the radiation direction of the flash unit to a plurality of different directions, based on a received status signal of the illumination apparatus; and controlling so as not to update display of the information about the photometry result on the display unit when the illumination apparatus is performing the first operation.

26. A non-transitory computer-readable recording medium storing a program for causing a computer to execute a method of controlling an imaging apparatus which images with the use of an illumination apparatus comprising a photometry unit and a flash unit which changes a radiation direction automatically, the method controlling the imaging apparatus comprising:

displaying information about a photometry result on a display unit according to photometry using the photometry unit;

determining whether the illumination apparatus is performing a first operation of multiple emissions by the flash unit while changing automatically the radiation direction of the flash unit to a plurality of different directions, based on a received status signal of the illumination apparatus; and controlling the photometry unit so as not to perform the photometry using the photometry unit when the illumination apparatus is performing the first operation.

* * * * *